United States Patent
Buhlman et al.

(10) Patent No.: US 6,862,608 B2
(45) Date of Patent: Mar. 1, 2005

(54) SYSTEM AND METHOD FOR A DISTRIBUTED SHARED MEMORY

(75) Inventors: Craig A. Buhlman, Boulder, CO (US); Anthony J. Casorso, Westminster, CO (US)

(73) Assignee: Storage Technology Corporation, Louisville, CO (US)

(*) Notice: Subject to any disclaimer, the term of this patent is extended or adjusted under 35 U.S.C. 154(b) by 540 days.

(21) Appl. No.: 09/906,509

(22) Filed: Jul. 17, 2001

(65) Prior Publication Data

US 2003/0018737 A1 Jan. 23, 2003

(51) Int. Cl.$^7$ .................................... G06F 15/167
(52) U.S. Cl. ................... 709/213; 709/203; 711/147
(58) Field of Search ........................ 711/147, 148, 711/150, 151, 152; 709/213, 203

(56) References Cited

U.S. PATENT DOCUMENTS

| | | | | |
|---|---|---|---|---|
| 5,146,607 A | * | 9/1992 | Sood et al. ................ | 711/211 |
| 5,303,362 A | * | 4/1994 | Butts et al. ................ | 711/121 |
| 5,390,316 A | | 2/1995 | Cramer et al. | |
| 5,991,819 A | * | 11/1999 | Young ..................... | 709/253 |
| 6,049,889 A | * | 4/2000 | Steely et al. .............. | 714/4 |

OTHER PUBLICATIONS

J. Brzezinski: "RPC–based coherence protocols for distributed shared memory", Online! 1997, pp. 1–5, XP002291996.
J. B. Carter; "Technique for reducing consistency–related communication in distributed shared memory systems"; Online! 1993, XP002291997.

* cited by examiner

Primary Examiner—Hiep T. Nguyen
(74) Attorney, Agent, or Firm—Brooks Kushman P.C.

(57) ABSTRACT

A system and method for a distributed shared memory. The system includes multiple processors, each processor transmitting write commands issued therefrom concerning a shared memory to each of the processors, such that each processor receives each shared memory write command transmitted. The system also includes multiple local memories, each local memory associated with one of the processors and having a copy of the shared memory, wherein each processor completes each received shared memory write command at its associated local memory such that the copies of the shared memory remain consistent at all times. The method includes transmitting write commands concerning the shared memory to each of the processors, such that each processor receives each shared memory write command transmitted, and completing each received shared memory write command at the associated local memory such that the copies of the shared memory remain consistent at all times.

20 Claims, 3 Drawing Sheets

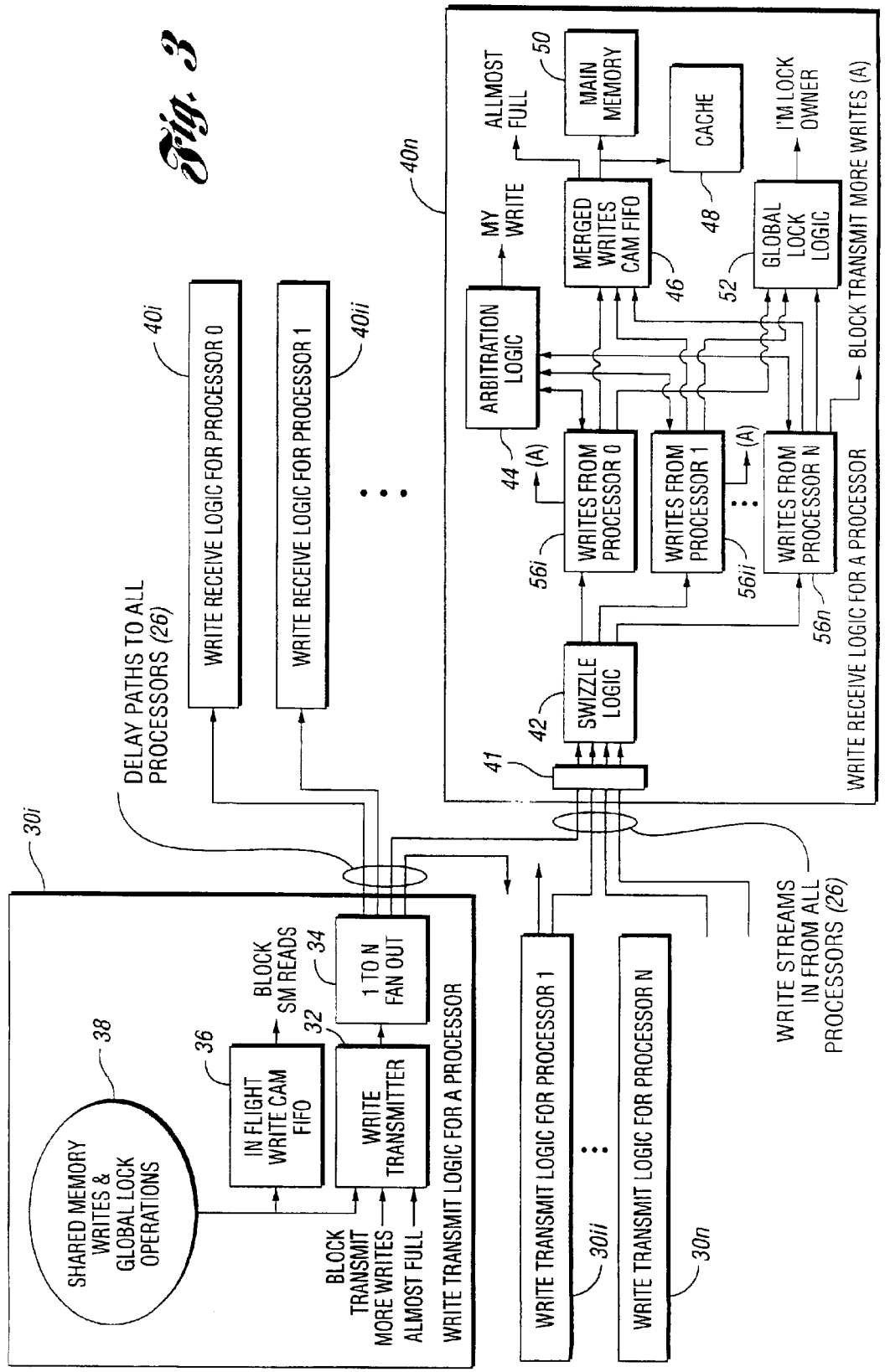

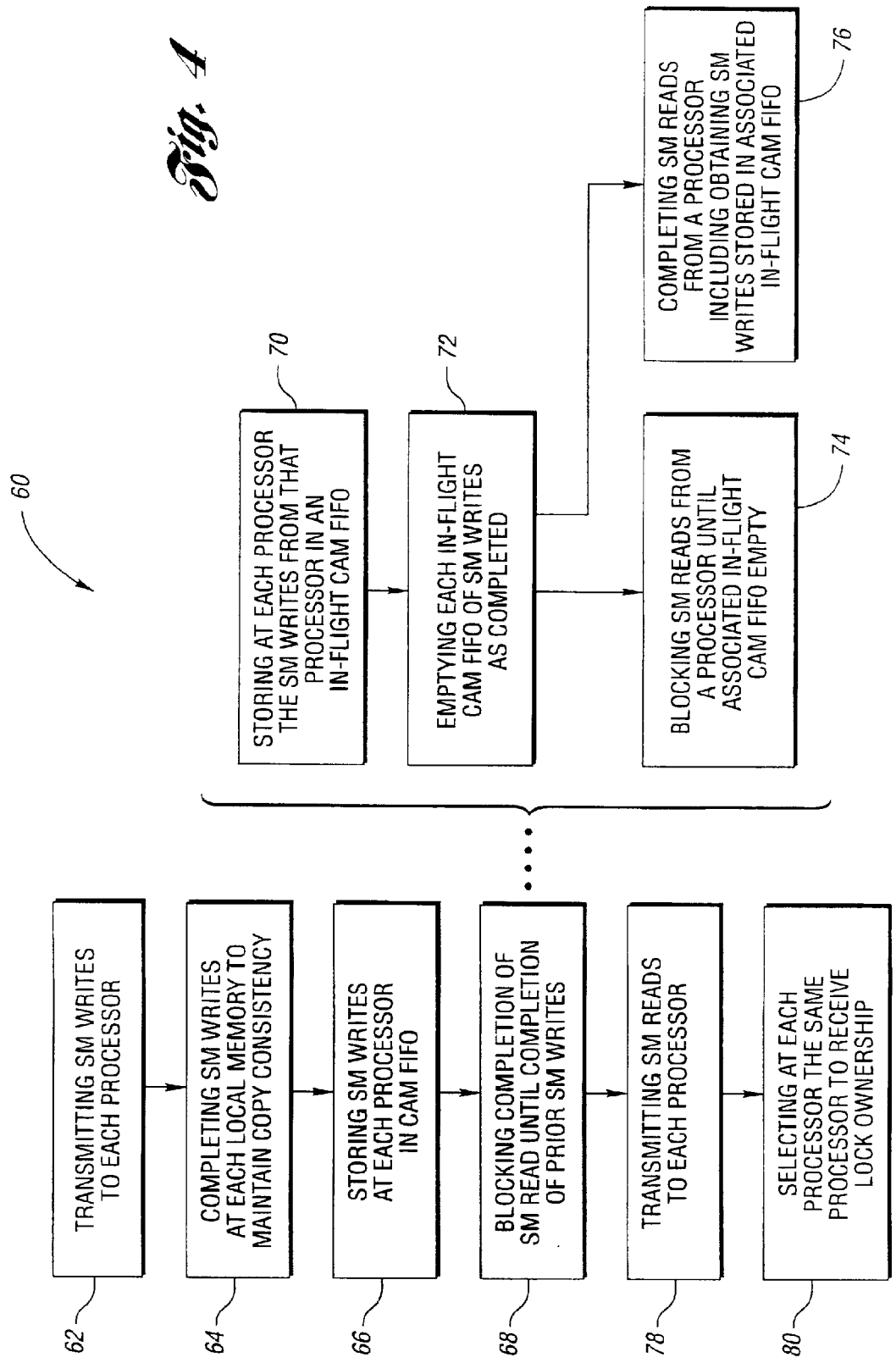

SYSTEM AND METHOD FOR A DISTRIBUTED SHARED MEMORY

TECHNICAL FIELD

The present invention relates generally to a system and method for a distributed shared memory and, more particularly, to a distributed shared memory system and method including a plurality of local memories, each local memory having a copy of the shared memory, wherein the copies of the shared memory remain consistent at all times.

BACKGROUND ART

In present Shared Virtual Array (SVA) systems, the centralized shared memory is located on a circuit card separate from the circuit cards where the multiple processors are located. This creates a bottleneck which limits total system performance in two ways. First, the transport latency of getting a memory operation from a processor card to the shared memory card, and then getting the results back, limits the total number of operations that can be done in any given unit of time. Second, since the shared memory operations for all of the processors are single threaded through the memory, the bandwidth of the memory limits the total number of memory operations available to all of the processors. Further, the bandwidth of shared memory operations available to any given processor is limited to the memory bandwidth divided by the total number of processors.

These centralized shared memory bottleneck problems can be solved by providing each processor with its own local copy of the shared memory. This greatly reduces the latency problem because the memory can be physically placed much closer to the processor and run at much higher clock rates. Such a distributed shared memory also improves the shared memory bandwidth because the memories only have to perform read operations from a single processor instead of from all of the processors.

However, such a distributed shared memory architecture creates a new set of problems that did not exist in the central shared memory architecture. Specifically, with such a distributed shared memory, consistency must be maintained between the multiple copies of the same shared memory image. In that regard, there are two types of consistency that must be maintained if the distributed shared memories are to behave the same as a centralized shared memory. These types of consistency may be referred to as copy consistency and sequential consistency.

Copy consistency means that each individual processor's view of its copy of the shared memory is the same as all of the other processors' views of their respective copies of the shared memory at any and every instant in time. This means that any sequence of write operations done on multiple processors to the same location in the shared memory must produce the same results in all copies of that shared memory location. Sequential consistency means that two sequences of instructions running in parallel, sharing data, must produce the same results in all copies of the shared memory when running on two processors as when running on a single processor with a single memory.

Thus, there is needed an improved system and method for a shared memory. Such a system and method would provide local copies of a shared memory to each of a plurality of processors to overcome the bottleneck problems associated with the centralized shared memory architecture of the prior art, while at the same time maintaining consistency in all copies of the distributed shared memory. In particular, such a system and method for a distributed shared memory would maintain copy consistency by ensuring that each of the plurality of processors performs the same write operations on its local copy of the shared memory in the same order. Such a distributed shared memory system and method would also serialize operations of the multiple processors and maintain sequential consistency, such as by prohibiting a processor from performing a read operation on the shared memory while any prior write operations remain unfinished, thereby guaranteeing that all prior write operations can be seen by all processors. In such a fashion, such a system and method could thereby form the backbone of communications between multiple processors in any product (such as a virtual disk controller), working independently of the transport delay or physical separation of multiple processors and making possible a strongly consistent shared memory across networked computers.

SUMMARY OF THE INVENTION

Accordingly, it is an object of the present invention to provide a system and method for a distributed shared memory including a plurality of local memories, each local memory having a copy of a shared memory, wherein the copies of the shared memory remain consistent at all times.

According to the present invention, then a system is provided for a distributed shared memory. The system comprises a plurality of processors, each processor transmitting write commands issued therefrom concerning a shared memory to each of the plurality of processors, such that each processor receives each shared memory write command transmitted. The system further comprises a plurality of local memories, each local memory associated with one of the plurality of processors and having a copy of the shared memory, wherein each processor completes each received shared memory write command at its associated local memory such that the copies of the shared memory remain consistent at all times.

Still further according to the present invention, a method is also provided for a distributed shared memory in a system including a plurality of processors and a plurality of local memories, each local memory associated with one of the plurality of processors and having a copy of a shared memory. The method comprises transmitting write commands concerning the shared memory to each of the plurality of processors, such that each processor receives each shared memory write command transmitted, and completing each received shared memory write command at the associated local memory such that the copies of the shared memory remain consistent at all times.

The above objects and other objects, features, and advantages of the present invention are readily apparent from the following detailed description of the best mode(s) for carrying out the present invention when taken in connection with the accompanying drawings.

BRIEF DESCRIPTION OF THE DRAWINGS

FIG. 3 illustrates a more detailed block diagram of the distributed shared memory system architecture according to the present invention, showing the transmit and receive architecture and logic associated with each of a plurality of processors; and FIG. 4 illustrates a simplified, representative flowchart of the method for a distributed shared memory according to the present invention.

BEST MODE(S) FOR CARRYING OUT THE INVENTION

Figure 1:
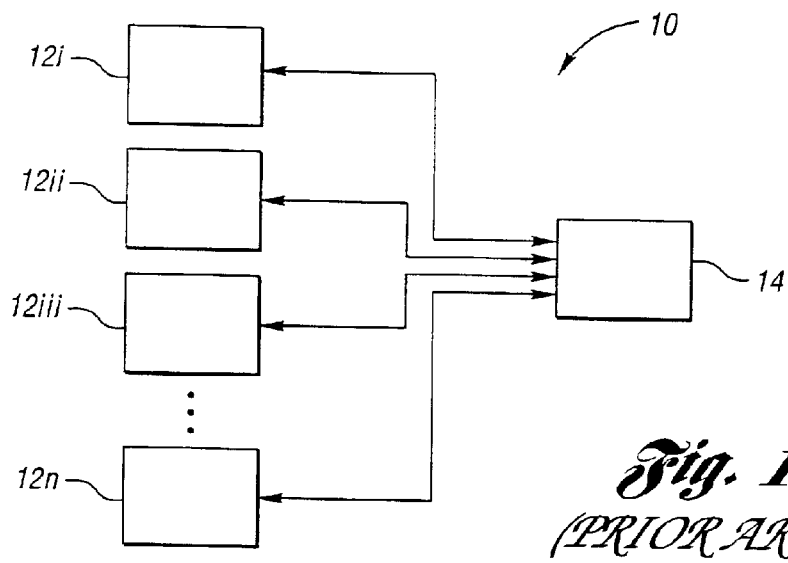
FIG. 1 illustrates a simplified block diagram of a centralized shared memory system architecture according to the prior art.

With reference to FIGS. 1–4, the preferred embodiment of the distributed shared system and method of the present invention will now be described in greater detail. Referring first to FIG. 1, a simplified block diagram of a centralized shared memory system architecture according to the prior art is shown, denoted generally by reference numeral 10. As seen therein, shared memory system (10) includes a plurality of processors (12i, 12ii, 12iii . . . 12n). The processors (12i, 12ii, 12iii . . . 12n) are each provided in communication with a single, centralized shared memory (14).

As previously noted, in such a prior art system architecture (10), centralized shared memory (14) is located on a circuit card separate from the circuit cards where the multiple processors (12i, 12ii, 12iii . . . 12n) are located. This creates a bottleneck which limits performance of the shared memory system (10) in two ways. First, as a result of the transport latency of getting a memory operation from a processor card to the shared memory card, and then getting the results back, the total number of operations that can be done in any given unit of time is limited. Second, because the shared memory operations for processors (12i, 12ii, 12iii . . . 12n) are single threaded through centralized shared memory (14), the bandwidth of centralized shared memory (14) limits the total number of memory operation available to processors (12i, 12ii, 12iii . . . 12n). Further, the bandwidth of centralized shared memory (14) available to any given processor (12i, 12ii, 12iii . . . 12n) is limited to the memory bandwidth divided by the total number of processors.

As also previously noted, these bottleneck problems associated with prior art system architecture (10) can be solved by providing each processor (12i, 12ii, 12iii . . . 12n) with its own local copy of the shared memory (14). In that regard, referring next to FIG. 2, a simplified block diagram of the distributed shared memory system architecture according to the present invention is shown, denoted generally by reference numeral 20. As seen therein, distributed shared memory system (20) includes a plurality of processors (22i, 22ii, 22iii . . . 22n). In contrast to prior art shared memory system (10) depicted in FIG. 1, however, in distributed shared memory system (20), each of the processors (22i, 22ii, 22iii . . . 22n) are provided in communication with its own associated local copy of the shared memory (24i, 24ii, 24iii . . . 24n). In this fashion, the distributed shared memory system (20) thereby greatly reduces the latency problem because the shared memory (24i, 24ii, 24iii . . . 24n) is physically placed much closer to each processor (22i, 22ii, 22iii . . 22n) so that they may run at much higher clock rates. The distributed shared memory system (20) also improves the shared memory bandwidth because each of the local copies of the shared memories (24i, 24ii, 24iii . . . 24n) only has to perform read operations from its associated processor (22i, 22ii, 22iii . . . 22n) instead of from all of the processors.

However, as also noted previously, such a distributed shared memory architecture (20) creates a new set of problems that did not exist in the centralized shared memory architecture (10) of FIG. 1. Specifically, with such a distributed shared memory system (20), consistency must be maintained between the multiple copies of the shared memory (24i, 24 ii, 24 iii . . . 24n). In particular two types of consistency, which may be referred to as copy consistency and sequential consistency, must be maintained if the distributed shared memories (24i, 24 ii, 24iii . . . 24n) are to behave the same as the centralized shared memory (14) of FIG. 1. Copy consistency means that the view of each individual processor (22i, 22ii, 22iii . . . 22n) of its copy of the shared memory (24i, 24 ii, 24 iii . . . 24n) is the same as the view of each of the other processors (22i, 22ii, 22iii . . . 22n) of their respective copies of the shared memory (24i, 24 ii, 24 iii . . . 24n) at any and every instant in time. This means that any sequence of write operations done on multiple processors (22i, 22ii, 22iii . . 22n) to the same location in the shared memory must produce the same results in all copies of that shared memory location (24i, 24 ii, 24iii . . . 24n). Sequential consistency means that two sequences of instructions running in parallel, sharing data, must produce the same results in all copies of the shared memory (24i, 24 ii, 24 iii . . . 24n) when running on two processors (22i, 22ii, 22iii . . . 22n) as when running on a single processor with a single memory.

The solution to the consistency problems are solved by the fashion in which operations or commands from the multiple processors (22i, 22ii, 22iii . . . 22n) are distributed. In that regard, still referring to FIG. 2, in addition to being provided in communication with its associated copy of the shared memory (24i, 24ii, 24 iii . . . 24n), it can be seen that each of the plurality of processors (22i, 22ii, 22iii . . . 22n) is also provided in communication with every one of the plurality of processors (22i, 22ii, 22iii . . . 22n), including itself, by a plurality of delay paths (26). Delay paths (26) are provided such that a write command from a processor (22i, 22ii, 22iii . . . 22n) concerning the shared memory is transmitted to all processors (22i, 22ii, 22iii . . 22n), including the originating processor (22i, 22ii, 22iii . . . 22n), so that the shared memory write command arrives in all processors (22i, 22ii, 22iii . . . 22n) simultaneously. Since all processors (22i, 22ii, 22iii . . . 22n) see the write commands simultaneously, they all process those commands at the same time and in the same order. In that regard, provided they facilitate such operation, delay paths (26) may take any of a number of forms known in the art.

Figure 2:
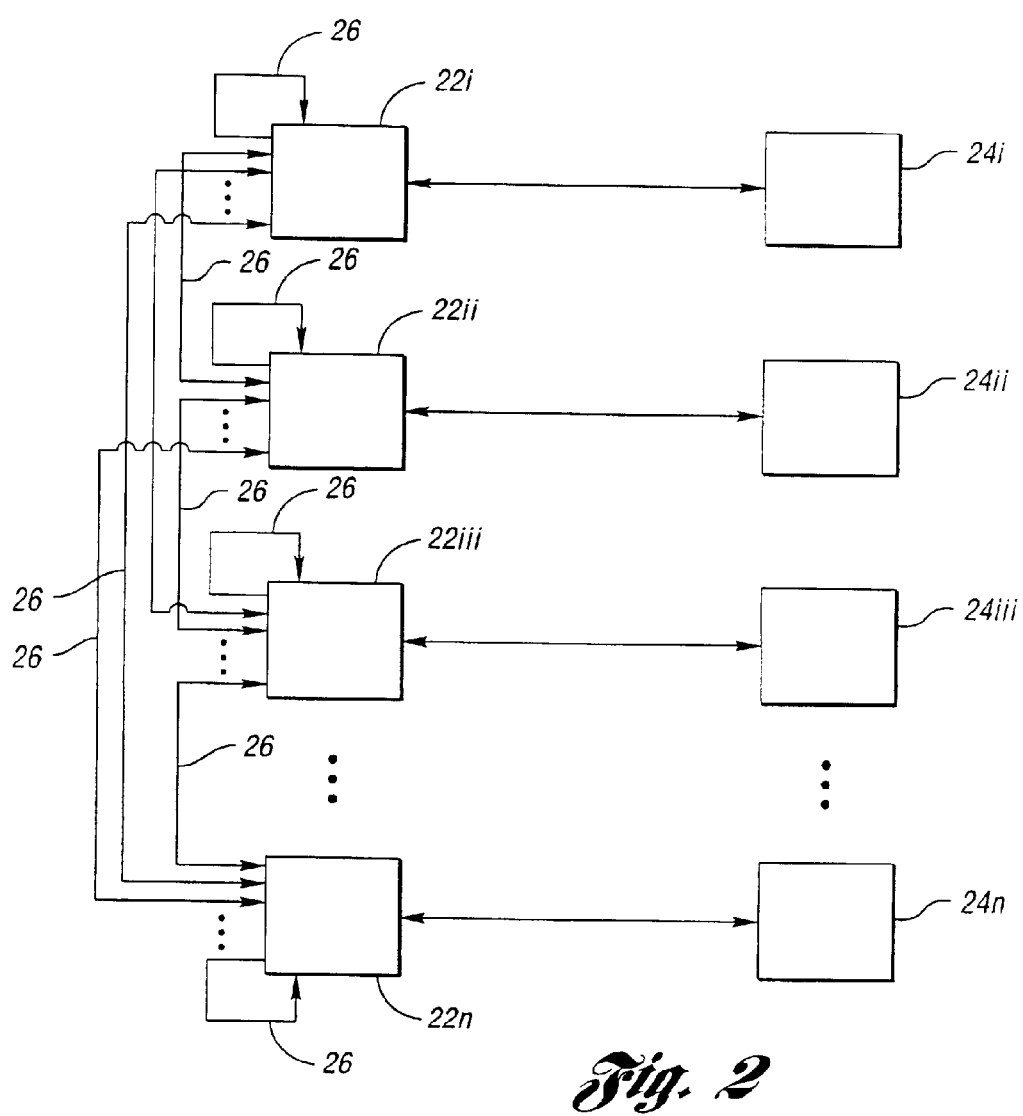
FIG. 2 illustrates a simplified block diagram of the distributed shared memory system architecture according to the present invention.

Referring now to FIG. 3, with continuing reference to FIG. 2, a more detailed block diagram of the distributed shared memory system architecture according to the present invention is shown, including transmit and receive architecture and logic associated with each of the plurality of processors (22i, 22ii, 22iii . . . 22n). As seen in FIG. 3, each of the plurality of processors includes write command transmit logic (30i, 30ii . . . 30n) and write command receive logic (40i, 40ii . . . 40n). Write transmit logic (30i, 30ii . . . 30n), which will be described in greater detail below, operates to transmit shared memory write commands from the associated processor (22i, 22ii, 22iii . . 22n) via delay paths (26) to each of the plurality of processors (22i, 22ii, 22iii . . . 22n), including itself. Write commands so transmitted are received at each of the processors (22i, 22ii, 22iii . . . 22n) by the associated write receive logic (40i, 40ii . . . 40n).

More particularly, as seen in FIG. 3, the write transmit logic (30i, 30ii . . . 30n) associated with each of the processors (22i, 22ii, 22iii . . . 22n) each include a write transmitter (32), fanout logic (34) and an "in-flight" write content addressable memory (CAM) (36) (the operation of which is described below). Write transmitter (34) takes in shared memory write commands (38), global lock operations (38) and other status to produce a communications stream in a manner well known to those of ordinary skill in the art. Fanout logic (34) takes this communications stream, makes as many copies as there are processors (22i, 22ii, 22iii . . . 22n) and, with equal delay, drives such copies to each of the plurality of processors (22i, 22ii, 22iii . . . 22n).

Still referring to FIG. 3, write receive logic (40i, 40ii . . . 40n) associated with each of the processors (22i, 22ii, 22iii . . . 22n) each include delay compensation logic (41), swizzle logic (42), arbitration logic (44), a content addressable memory (CAM) (46), a cache (48), a main memory (50), and global lock logic (52) (the operation of which is described in greater detail below). CAM (46), cache (48) and main memory (50) together comprise a local memory, and include a copy of the shared memory. Incoming write commands transmitted from processors (22i, 22ii, 22iii . . . 22n) are received at delay compensation logic (41), which tunes the delay of each delay path (26) to make them all equal. The write commands are then forwarded to swizzle logic (42) and identified according to the particular processor (22i, 22ii, 22iii . . . 22n) from which the write commands originated, after which they are forwarded to a corresponding write command queue (56i, 56ii . . . 56n) for the particular associated processor (22i, 22ii, 22iii . . . 22n). The write commands arrive at the front of each of the write command queues (56i, 56ii . . . 56n) simultaneously.

When, in the fashion previously described, each individual write command arrives at the front of the write command queues (56i, 56ii . . . 56n) in all processors (22i, 22ii, 22iii . . . 22n) simultaneously, arbitration logic (44) in each processor sees identical requests, and thus the same write command is selected to be processed in all of the processors (22i, 22ii, 22iii . . . 22n). The selected write command is then merged into the associated CAM (46) in a first-in, first-out (FIFO) fashion in all of the processors (22i, 22ii, 22iii . . . 22n) at the same time, at which point that write command becomes readable in all of the processors (22i, 22ii, 22iii . . . 22n). That is, each CAM FIFO (46) contains the latest shared memory write commands and, once a write command is stored in this fashion, that write command has been completed. The above process may repeat any number of times.

CAM FIFO (46) holds all the writes until they can be written into main memory (50) and/or cache (48). In that regard, CAM FIFO (46) may use cache (48) in a manner well known to those of ordinary skill in the art. Together, as previously noted, CAM FIFO (46), cache (48) and main memory (50) comprise the local copy of the shared memory. Local read commands are satisfied by obtaining the newest contents from either CAM FIFO (46), cache (48), or main memory (50), in that order. As can be seen from the above description, copy consistency is maintained because each of the plurality of processors (22i, 22ii, 22iii . . . 22n) performs the write operations in the same order.

As CAM FIFO (46) fills up, it must signal all of the processors (22i, 22ii, 22iii . . . 22n) to stop transmitting new write command so that CAM FIFO (46) will always have room to store all the write commands that are "in-flight." More particularly, as can be seen from FIG. 3, when CAM FIFO (46) is almost full, that condition is signaled to the write transmit logic (30) on the associated processor. The write transmitter (32) and fanout logic (34) operate as previously described to transmit the almost full condition of CAM FIFO (46) to each of the plurality of processors (22i, 22ii, 22iii . . . 22n) in the form of a command (A) to block transmission of any more write commands, where it is received by the write command queues (56i, 56ii . . . 56n). When any one of the write command queues (56i, 56ii . . . 56n) receives such a block command, the write transmitters (32) are signaled, and transmission of any new write commands is suspended. Such a block command is transmitted so long as CAM FIFO (46) continues to signal almost full. When the almost full condition abates, transmission of the block command ceases, and transmission of write commands resumes.

Sequential consistency is maintained by prohibiting a processor (22i, 22ii, 22iii . . . 22n) from performing a read operation concerning the shared memory while any prior write operation of that particular processor (22i, 22ii, 22iii . . . 22n) remain unfinished, or "in-flight." This guarantees that all prior write operations from a particular processor (22i, 22ii, 22iii . . . 22n) have finished and can be seen by all of the plurality of processors (22i, 22ii, 22iii . . . 22n). As previously noted, as seen in FIG. 3, write transmit logic (30i, 30ii . . . 30n) for each of the plurality of processors (22i, 22ii, 22iii . . . 22n) includes a write transmitter (32), fan out logic (34), and an "in-flight" write CAM (36). Write transmitter (32) and fan out logic (34) operate, as previously described, to transmit a write command from the associated processor (22i, 22ii, 22iii . . 22n) to each of the plurality of processors (22i, 22ii, 22iii . . . 22n) via the plurality of delay paths (26). The blocking of shared memory read operations is accomplished by pushing each such write command being transmitted into the "in-flight" CAM (36) in a first-in, first-out fashion, and popping that write out of "in-flight" CAM FIFO (36) when the write is received and written to the merged writes CAM FIFO (46). Shared memory read operations are blocked if "in-flight" CAM FIFO (36) is not empty. In this manner, a processor (22i, 22ii, 22iii . . . 22n) is guaranteed that its shared memory writes can be seen by all other processors (22i, 22ii, 22iii . . . 22n) before it proceeds with its own shared memory read.

Global locks provide a mechanism to serialize system operations through the set and release of the locks. In known systems, a global lock set operation may be signaled by a shared memory read from a special address range, and the lock release may be signaled by a write operation to that address range. According to the present invention, and still referring to FIG. 3, global lock set and release operations (38) are transmitted via the same write transmit logic (30i, 30ii . . . 30n) and delay paths (26) as the shared memory write operations (38) previously described. As a result, global lock set and release operation are also processed simultaneously and identically at all of the plurality of processors (22i, 22ii, 22iii . . 22n).

More particularly, a processor (22i, 22ii, 22iii . . . 22n) acquires a global lock by performing a shared memory read with the special address modifier set. The lock request is transmitted by write transmit logic (30i, 30ii . . . 30n) through write transmitter (32), fan out logic (34), the plurality of delay paths (26), the delay compensation logic (41), the swizzle logic (42), and the write command queues (56i, 56ii . . . 56n) of all of the processors (22i, 22ii, 22iii . . . 22n), where the lock request arrives in the associated global lock logic (52) at the same time in each of the processors (22i, 22ii, 22iii . . . 22n). Since all copies of the global lock logic (52) see the same requests, they all pick the same processor (22i, 22ii, 22iii . . . 22n) to receive lock ownership. The shared memory read operation of the processor (22i, 22ii, 22iii . . . 22n) granted lock ownership is then allowed to complete. The shared memory read operations for those processors (22i, 22ii, 22iii . . . 22n) not granted the lock remain blocked until they are granted the lock. The lock is released when the associated write command is written into the merged writes CAM FIFO (46) in all the processors (22i, 22ii, 22iii . . . 22n). After the global lock is released, ownership is granted to the next processor (22i, 22ii, 22iii . . . 22n) with a pending request for ownership, and its shared memory read is allowed to complete.

In that regard, since such global lock set and release operation can be used to serialize operations in the processors (22i, 22ii, 22iii . . . 22n) and maintain consistency, strong sequential consistency is not always necessary and a performance enhancement can be made. In particular, in a weaker consistency model, a shared memory read operation from a processor (22i, 22ii, 22iii . . . 22n) is allowed to complete even though prior write commands from that processor (22i, 22ii, 22iii . . . 22n) may still be "in-flight." In this case, reads from the "in-flight" blocking CAM FIFO (36) are done so that a processor (22i, 22ii, 22iii . . . 22n) will get back any data it may have just written. It should be noted that a global lock set will always be done with a strong consistency model because the lock set read flows though the same path as the prior writes so the prior writes all complete before the read is done. It should also be noted that since writes from a particular processor (22i, 22ii, 22iii . . . 22n) are processed in order, any writes done prior to the write that releases the global lock, and the write to release the lock, are guaranteed to be completed at the time the lock is released.

Referring finally to FIG. 4, a simplified, representative flowchart of the method for a distributed shared memory according to the present invention is shown, denoted generally by reference numeral 60. The distributed shared memory method (60) depicted is for use in a system including a plurality of processors and a plurality of local memories, each local memory associated with one of the plurality of processors and having a copy of the shared memory. As seen in FIG. 4, the method includes transmitting (62) write commands concerning the shared memory (SM) to each of the plurality of processors, such that each processor receives each shared memory write command transmitted, and completing (64) each received shared memory write command at the associated local memory such that the copies of the shared memory remain consistent at all times. In that regard, preferably, a shared memory write command transmitted from one of the plurality of processors is received by each of the plurality of processors simultaneously, and the shared memory write commands are completed at each local memory in the same order.

The method (60) of the present invention may also include storing (66) the received shared memory write commands at each processor in a content addressable memory in a first-in, first-out fashion. The method (60) may further include, when one of the plurality of processors issues a read command concerning the shared memory, blocking (68) completion of the shared memory read command until after completion of each shared memory write command issued before the shared memory read command. In that regard, the method (60) may include storing (70) at each processor the shared memory write commands issued by that processor in a content addressable memory (CAM) in a first-in, first-out fashion, emptying (72) each such CAM of its stored shared memory write commands as the stored shared memory write commands are completed, and blocking (74) completion of the shared memory read command issued by the one of the plurality of processors until its associated CAM is empty. Alternatively, the method (60) of the present invention may include completing (76) the shared memory read command issued by the one of the plurality of processors, wherein completing includes obtaining any shared memory write commands stored in the associated CAM. Finally, the method (60) may still further include transmitting (78) read commands concerning the shared memory to each of the plurality of processors, such that each processor receives each shared memory read command, wherein a shared memory read command transmitted from one of the plurality of processors is received by each of the plurality of processors simultaneously, and selecting (80) at each processors the same one of the plurality of processors to receive a lock ownership such that only the selected processor is enabled to complete the shared memory read command issued therefrom.

As is readily apparent from the foregoing detailed description, the present invention provides an improved system and method for a shared memory. In particular, the system and method of the present invention provide local copies of a shared memory to each of a plurality of processors to overcome the bottleneck problems associated with the centralized shared memory architecture of the prior art, while at the same time maintaining consistency in all copies of the distributed shared memory. The system and method for a distributed shared memory of the present invention maintain copy consistency by ensuring that each of the plurality of processors performs the same write operations on its local copy of the shared memory in the same order. The distributed shared memory system and method of the present invention also serialize operations of the multiple processors and maintain sequential consistency, such as by prohibiting a processor from performing a read operation on the shared memory while any prior write operations remain unfinished, thereby guaranteeing that all prior write operations can be seen by all processors. In such a fashion, the system and method of the present invention are thereby capable of forming the backbone of communications between multiple processors in any product, working independently of the transport delay or physical separation of multiple processors and making possible a strongly consistent shared memory across networked computers.

Thus it is apparent that there has been provided, in accordance with the present invention, an improved shared memory system and method having a more efficient distributed shared memory including a plurality of local memories, each local memory having a copy of the shared memory, wherein the copies of the shared memory remain consistent at all times. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A system for a distributed shared memory comprising:

a plurality of processors, each processor transmitting write commands issued therefrom concerning a shared memory to each of the plurality of processors, such that each processor receives each shared memory write command transmitted;

a plurality of local memories, each local memory associated with one of the plurality of processors and having a copy of the shared memory;

wherein each processor completes each received shared memory write command at its associated local memory such that the copies of the shared memory remain consistent at all times.

2. The system of claim 1 further comprising:
  delay compensation logic operating such that a shared memory write command transmitted from one of the plurality of processors is received by each of the plurality of processors simultaneously; and
  a plurality of arbitration logic devices, each arbitration logic device associated with one of the plurality of processors and operating such that the shared memory write commands are completed by each processor in the same order.

3. The system of claim 2 wherein each of the plurality of local memories includes a content addressable memory (CAM) for storing received shared memory write commands in a first-in, first-out fashion such that the received shared memory write commands are completed.

4. The system of claim 1 wherein, when one of the plurality of processors issues a read command concerning the shared memory, completion of the shared memory read command is blocked until after completion of each shared memory write command issued before the shared memory read command.

5. The system of claim 2 wherein, when one of the plurality of processors issues a read command concerning the shared memory, completion of the shared memory read command is blocked until after completion of each shared memory write command issued before the shared memory read command.

6. The system of claim 4 further comprising a plurality of content addressable memory (CAM), each CAM associated with one of the plurality of processors and storing the shared memory write commands issued by its associated processor in a first-in, first-out fashion, wherein each CAM is emptied of its stored shared memory write commands as the stored shared memory write commands are completed by the plurality of processors, and completion of the shared memory read command issued by the one of the plurality of processors is blocked until its associated CAM is empty.

7. The system of claim 5 further comprising a plurality of content addressable memory (CAM), each CAM associated with one of the plurality of processors and storing the shared memory write commands issued by its associated processor in a first-in, first-out fashion, wherein each CAM is emptied of its stored shared memory write commands as the stored shared memory write commands are completed by the plurality of processors, and completion of the shared memory read command issued by the one of the plurality of processors is blocked until its associated CAM is empty.

8. The system of claim 4 further comprising a plurality of content addressable memory (CAM), each CAM associated with one of the plurality of processors and storing the shared memory write commands issued by its associated processor in a first-in, first-out fashion, wherein each CAM is emptied of its stored shared memory write commands as the stored shared memory write commands are completed by the plurality of processors, and completion of the shared memory read command issued by the one of the plurality of processors includes obtaining any shared memory write commands stored in its associated CAM.

9. The system of claim 5 further comprising a plurality of content addressable memory (CAM), each CAM associated with one of the plurality of processors and storing the shared memory write commands issued by its associated processor in a first-in, first-out fashion, wherein each CAM is emptied of its stored shared memory write commands as the stored shared memory write commands are completed by the plurality of processors, and completion of the shared memory read command issued by the one of the plurality of processors includes obtaining any shared memory write commands stored in its associated CAM.

10. The system of claim 1 wherein each processor transmits read commands issued therefrom concerning the shared memory to each of the plurality of processors, such that each processor receives each shared memory read command, the system further comprising:
  delay compensation logic operating such that a shared memory read command transmitted from one of the plurality of processors is received by each of the plurality of processors simultaneously; and
  a plurality of global lock logic devices, each global lock logic device associated with one of the plurality of processors and selecting the same one of the plurality of processors to receive a lock ownership such that only the selected processor is enabled to complete the shared memory read command issued therefrom, and the remainder of the plurality of processors are required to wait to receive the lock ownership to complete the shared memory read commands issued therefrom.

11. A method for a distributed shared memory in a system including a plurality of processors and a plurality of local memories, each local memory associated with one of the plurality of processors and having a copy of a shared memory, the method comprising:
  transmitting write commands concerning the shared memory to each of the plurality of processors, such that each processor receives each shared memory write command transmitted; and
  completing each received shared memory write command at the associated local memory such that the copies of the shared memory remain consistent at all times.

12. The method of claim 11 wherein a shared memory write command transmitted from one of the plurality of processors is received by each of the plurality of processors simultaneously, and the shared memory write commands are completed at each local memory in the same order.

13. The method of claim 12 wherein each of the plurality of local memories includes a content addressable memory (CAM), and the method further comprises storing received shared memory write commands in the CAM in a first-in, first-out fashion such that the received shared memory write commands are completed.

14. The method of claim 11 further comprising, when one of the plurality of processors issues a read command concerning the shared memory, blocking completion of the shared memory read command until after completion of each shared memory write command issued before the shared memory read command.

15. The method of claim 12 further comprising, when one of the plurality of processors issues a read command concerning the shared memory, blocking completion of the shared memory read command until after completion of each shared memory write command issued before the shared memory read command.

16. The method of claim 14 further comprising:
  storing at each processor the shared memory write commands issued by that processor in a content addressable memory (CAM) in a first-in, first-out fashion;
  emptying each CAM of its stored shared memory write commands as the stored shared memory write commands are completed; and
  blocking completion of the shared memory read command issued by the one of the plurality of processors until its associated CAM is empty.

17. The method of claim 15 further comprising:

storing at each processor the shared memory write commands issued by that processor in a content addressable memory (CAM) in a first-in, first-out fashion;

emptying each CAM of its stored shared memory write commands as the stored shared memory write commands are completed; and blocking completion of the shared memory read command issued by the one of the plurality of processors until its associated CAM is empty.

18. The method of claim 14 further comprising:

storing at each processor the shared memory write commands issued by that processor in a content addressable memory (CAM) in a first-in, first-out fashion;

emptying each CAM of its stored shared memory write commands as the stored shared memory write commands are completed; and completing the shared memory read command issued by the one of the plurality of processors, wherein completing includes obtaining any shared memory write commands stored in the associated CAM.

19. The method of claim 15 further comprising:

storing at each processor the shared memory write commands issued by that processor in a content addressable memory (CAM) in a first-in, first-out fashion;

emptying each CAM of its stored shared memory write commands as the stored shared memory write commands are completed; and completing the shared memory read command issued by the one of the plurality of processors, wherein completing includes obtaining any shared memory write commands stored in the associated CAM.

20. The method of claim 11 further comprising:

transmitting read commands concerning the shared memory to each of the plurality of processors, such that each processor receives each shared memory read command, wherein a shared memory read command transmitted from one of the plurality of processors is received by each of the plurality of processors simultaneously; and selecting at each processors the same one of the plurality of processors to receive a lock ownership such that only the selected processor is enabled to complete the shared memory read command issued therefrom, and the remainder of the plurality of processors are required to wait to receive the lock ownership to complete the shared memory read commands issued therefrom.

* * * * *